J. H. JENSEN.
PROPELLER.
APPLICATION FILED JUNE 25, 1912.
1,059,541.
Patented Apr. 22, 1913.
2 SHEETS—SHEET 1.
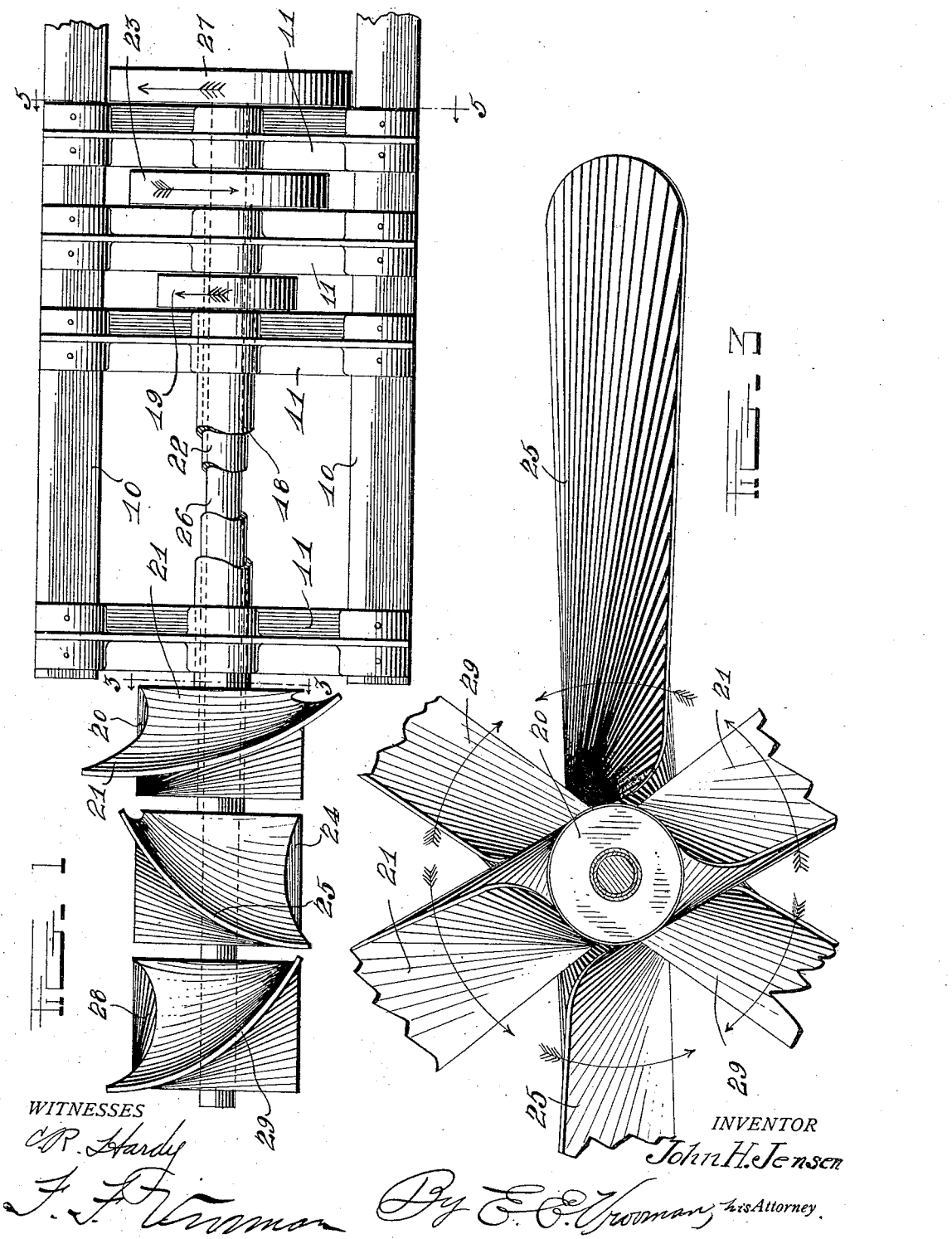
WITNESSES
INVENTOR
John H. Jensen
By E. E. Vrooman, his Attorney.

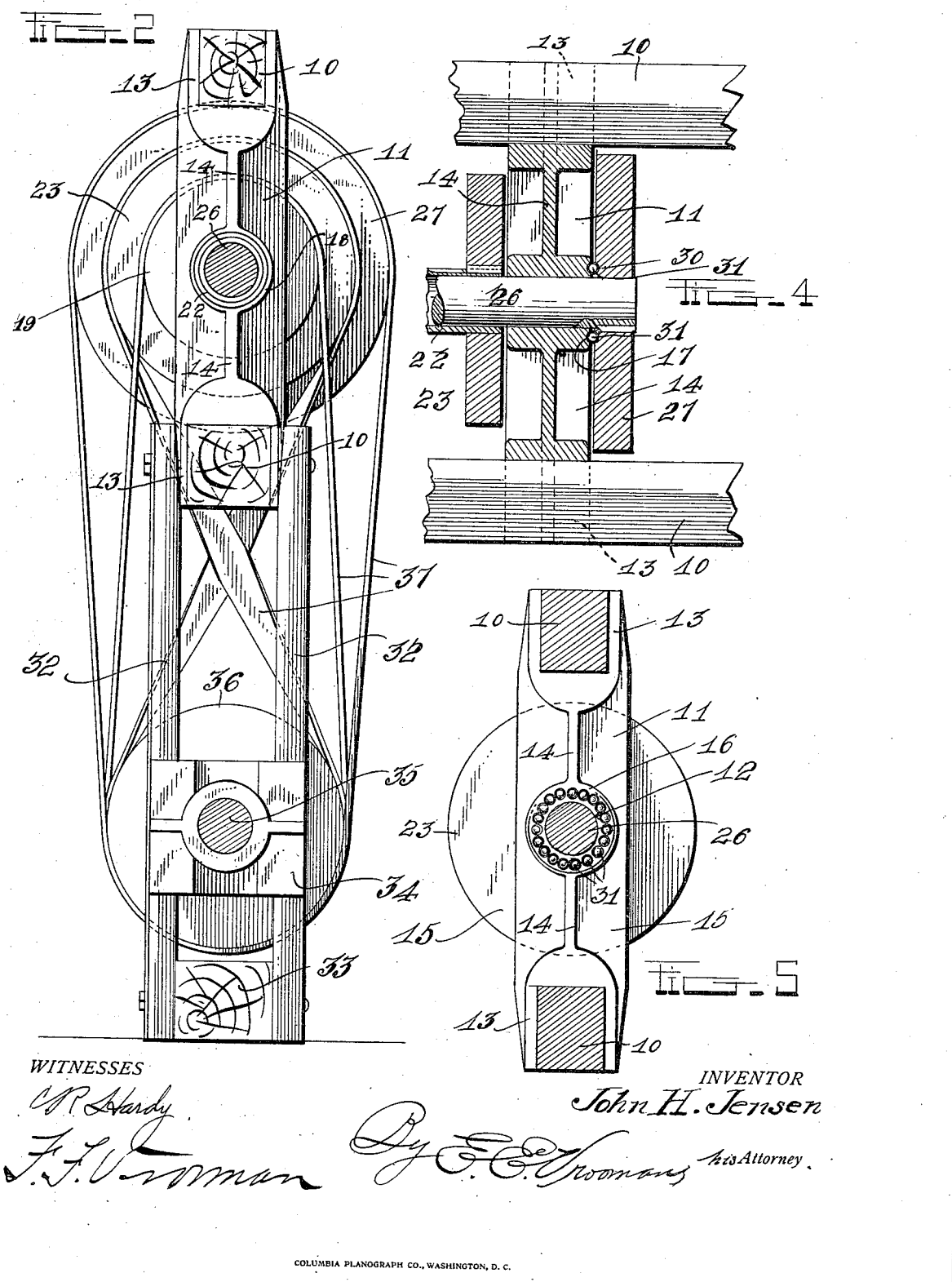

UNITED STATES PATENT OFFICE.

JOHN HENRY JENSEN, OF PRICE, ARIZONA.

PROPELLER.

1,059,541.  Specification of Letters Patent.  Patented Apr. 22, 1913.

Application filed June 25, 1912. Serial No. 705,811.

*To all whom it may concern:*

Be it known that I, JOHN H. JENSEN, a citizen of the United States, residing at Price, in the county of Pinal and State of Arizona, have invented certain new and useful Improvements in Propellers, of which the following is a specification, reference being had therein to the accompanying drawing.

This invention relates to propellers and has special reference to a propeller adapted for use in connection with flying machines and the driving means thereof.

The principal object of the invention is to improve the efficiency of flying machine propellers.

With the above and other objects in view, this invention consists in general of certain novel constructions, combinations and arrangements of parts, as will be hereinafter fully described, illustrated in the accompanying drawings, and specifically claimed.

In the accompanying drawings, like characters of reference indicate like parts in the several views, and:—Figure 1 is a plan view of a set of propellers and their driving shafts as constructed in accordance with this invention. Fig. 2 is a side elevation thereof. Fig. 3 is a section on the line 3—3, Fig. 1. Fig. 4 is a detail view of a certain bearing used herewith. Fig. 5 is a detail view on the line 5—5, Fig. 1.

The propellers in this invention are supported from a certain frame of which the longitudinal members are indicated at 10. Connecting these longitudinal frame members are cross bars 11 each of which is provided with a centrally disposed opening 12 and with yoke ends 13 which engage around the respective cross bar. For the sake of convenience it is preferred that these members be shaped somewhat like four-pointed stars in cross section between the yoke, there being provided vertically disposed webs 14 on each member having centrally disposed flanges 15 projecting from each side thereof. Centrally each cross member is provided with a boss 16 through which the opening 12 passes. Certain of these members 11 are provided with ball races 17 hereinafter to be described.

Journaled in two of the openings 12 is a hollow shaft 18 on one end whereof is mounted a belt pulley 19 while on the other end there is provided a propeller having a boss 20 and oppositely disposed blades 21.

Journaled in a second member 11 and extending through the hollow shaft 18 is a second hollow shaft 22 provided with a belt pulley 22 of greater diameter than the belt pulley 19 on one end and a propeller having a boss 24 and blades 25 of a greater pitch than the blades 21 on the other end.

Journaled in the remaining member 11 and passing through the hollow shaft 22 is a shaft 26 which is provided on one end with a belt pulley 27 of greater diameter than the belt pulley 23 at one of its ends and with a propeller having a boss 28 and blades 29 of greater pitch than the blades 25 at the other end. It will thus be observed that as the diameter of the belt pulley is increased in like manner does the pitch of the blade controlled thereby.

Each of the belt pulleys is provided with a ball race 30 and balls 31 are held between the ball races 17 and 30 so that the thrust is taken up by anti-friction means when the propellers are revolved.

Extending laterally from one of the members 10 is a pair of frame members 32 which are connected at their outer ends by the member 33. These members 32 serve to support a bearing 34 for a drive shaft 35 which carries a drum 36. Belts 37 connect this drum with the respective pulleys 19, 23, and 27 and it is to be noted that these belts are alternately straight and cross so that the propellers are rotated alternately in opposite directions, the pitch of the screw being in order to accommodate this, alternately right and left hand.

In the operation of the device it is to be noted that as the drum 36 is revolved the belts will drive the various shafts in an increasing ratio of speed from the inner shaft outward so that it will be necessary to have an increasing ratio of pitch from the forward to the rear propeller. It will also be noted that by this arrangement a series of propellers may be used all of which can be placed in the center line of resistance of the air ship, thus eliminating the tendency of the propellers to cause movement other than that in a straight line. Furthermore, by reason of the alternate propellers revolving in opposite directions gyroscopic action due to their movement may be eliminated.

Having thus described the invention, what is claimed as new, is:—

1. In a device of the character described, a series of telescoping shafts, a series of propellers each carried on a respective shaft, said propellers having a pitch varying in ratio from within outward, and means to drive said propellers simultaneously at different speeds, said means being arranged to drive the propellers at speeds having an inverse ratio to their pitches.

2. Propelling means for air ships and the like consisting of a series of propellers having alined hubs and blades, the pitch of the blades of the several propellers increasing throughout the series, and means to drive said propellers at speeds in inverse order to the pitches thereof.

3. Propelling means for air ships and the like consisting of a series of propellers having alined hubs and blades, the pitch of the blades of the several propellers increasing throughout the series, and means to drive said propellers at speeds in inverse order to the pitches thereof, said means being arranged to drive alternate propellers in opposite directions.

4. A series of shafts revolubly mounted one within another, a series of propellers mounted on said shafts and having blades of decreasing pitch from the inner shaft outward, the pitch of the blades on alternate propellers being opposite, a series of drive pulleys carried on said shafts at the ends opposite the blades and decreasing in diameter from the inner shaft outward, a drum, means to revolve said drum, and alternate straight and crossed belts extending around said drums and belt pulleys.

In testimony whereof I hereunto affix my signature in presence of two witnesses.

JOHN HENRY JENSEN.

Witnesses:
J. M. HOWLETT,
G. W. FINLAY.

Copies of this patent may be obtained for five cents each, by addressing the "Commissioner of Patents. Washington, D. C."